United States Patent
Boiko et al.

(10) Patent No.: US 12,259,713 B2
(45) Date of Patent: Mar. 25, 2025

(54) AUTOMATIC TUNING OF A PROPORTIONAL-INTEGRAL-DERIVATIVE CONTROLLER FOR DC-DC BUCK SWITCHING POWER CONVERTER

(71) Applicant: Khalifa University of Science and Technology, Abu Dhabi (AE)

(72) Inventors: Igor Boiko, Abu Dhabi (AE); Ahmed Shehada, Abu Dhabi (AE); Balanthi Mogru Abdul Rahiman Beig, Abu Dhabi (AE); Yan Yan, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 336 days.

(21) Appl. No.: 18/010,087

(22) PCT Filed: Jun. 29, 2021

(86) PCT No.: PCT/IB2021/055825
§ 371 (c)(1),
(2) Date: Dec. 13, 2022

(87) PCT Pub. No.: WO2022/003571
PCT Pub. Date: Jan. 6, 2022

(65) Prior Publication Data
US 2023/0266743 A1    Aug. 24, 2023

Related U.S. Application Data

(60) Provisional application No. 63/045,469, filed on Jun. 29, 2020.

(51) Int. Cl.
*G05B 19/4155* (2006.01)

(52) U.S. Cl.
CPC ............ *G05B 19/4155* (2013.01); *G05B 2219/42033* (2013.01)

(58) Field of Classification Search
None
See application file for complete search history.

(56) References Cited

U.S. PATENT DOCUMENTS 6,081,751 A   6/2000 Luo et al.
8,255,066 B2  8/2012 Boiko et al.

OTHER PUBLICATIONS

Atherton, Derek, "An Introduction to Nonlinearity in Control Systems", Bookboon, 2011., 176 pages.
(Continued)

*Primary Examiner* — Sean Shechtman
(74) *Attorney, Agent, or Firm* — Billion & Armitage

(57) ABSTRACT

A method of automatically tuning a proportional-integral-derivative (PID) controller (102) controlling a DC-DC converter (100) includes substituting the PID controller (102) with a modified relay feedback test (MRFT) (104) controller having a threshold parameter (β) and a magnitude parameter (h), iteratively determining a current error signal (e[k]) by measuring an output voltage (Vo[k]) of the DC-DC converter (100) and comparing it to a desired reference output voltage (Vo-ref), input the error signal (e[k]) to the MRFT (104), determining an output value (u[k]) of the MRFT, update the duty cycle (D) based on the output value (u[k]), operating the DC-DC converter (100) using the updated duty cycle (D), exciting oscillations in the loop containing the MRFT (104) and the DC-DC converter (100), measuring a frequency (Ω0) and amplitude (α0) of the output voltage (Vo[k]), updating PID controller parameters based on the frequency (Ω0) and amplitude (α0), and substituting the MRFT (104) with the PID controller (102).

18 Claims, 12 Drawing Sheets

(56) References Cited

OTHER PUBLICATIONS

Boiko, Igor, "Design of non-parametric process-specific optimal tuning rules for PID control of flow loops", Journal of the Franklin Institute; vol. 351.2; 2014; pp. 964-985., 23 pages.
Boiko, Igor, "Non-parametric tuning of PID controllers", Advances in Industrial Control; Springer London; 2013., 188 pages.
Corradini, L., et al., "Robust Relay-Feedback Based Autotuning for DC-DC Converters", 2007 IEEE Power Electronics Specialists Conference., 7 pages.
Maksimovic, Dragan, et al., "Impact of Digital Control in Power Electronics", Proceedings of the 2004 International Symposium on Power Semiconductor Devices & ICs, Kitakyushu; pp. 13-22; May 2004., 10 pages.
Miao, Botao, et al., "Automated digital controller design for switching converters", 2005 IEEE 36th Power Electronics Specialists Conference; pp. 2729-2735; Jun. 2005., 7 pages.
Serrano, Victoria, et al., "A Study on the On-line System Identification and PID Tuning of a Buck Converter", Proceedings of 2016 IEEE 13th International Conference on Networking, Sensing, and Control Mexico City, Mexico, Apr. 28-30, 2016., 5 pages.
Shehada, Ahmed, et al., "Comparison of Relay Feedback Tuning and Other Tuning Methods for a Digitally Controlled Buck Converter", In IECON 2019—45th Annual Conference of the IEEE Industrial Electronics Society; vol. 1; pp. 1647-1652., 6 pages.
Shirazi, Mariko, et al., "An Autotuning Digital Controller for DC-DC Power Converters Based on Online Frequency-Response Measurement", IEEE Transactions on Power Electronics; vol. 24, No. 11; pp. 2578-2588; Nov. 2009., 11 pages.
Shirazi, M., "Autotuning Techniques for Digitally-Controlled Point-of-Load Converters with Wide Range of Capacitive Loads", In APEC 07—Twenty-Second Annual IEEE Applied Power Electronics Conference and Exposition; pp. 14-22., 7 pages.
Stefanutti, Walter, et al., "Autotuning of Digitally Controlled DC-DC Converters Based on Relay Feedback", IEEE Transactions on Power Electronics; vol. 22, No. 1, Jan. 2007., 9 pages.
Zhao, Zhenyu, et al., "Limit-Cycle Oscillations Based Auto-Tuning System for Digitally Controlled DC-DC Power Supplies", IEEE Transactions on Power Electronics; vol. 22, No. 6, Nov. 2007., 12 pages.
"International Search Report and Written Opinion Received mailed Sep. 9, 2021", Sep. 9, 2021, 9 pages.
Shehada, Ahmed, "Comparison of Relay Feedback Tuning and Other Tuning Methods for a Digitally Controlled Buck Converter", IECON 2019—45th Annual Conference of the IEEE Industrial Electronics Society, Retrieved from the Internet <doi: 10.1109/IECON.2019.8926893>, pp. 1647-1652.
Stefanutti, W, et al., "Autotuning of Digitally Controlled Buck Converters Based on Relay Feedback", Transactions on Power Electronics, vol. 22, No. 1; Retrieved from the Internet <doi: 10.1109/TPEL.2006.886614, Jan. 2007, pp. 199-207.

AUTOMATIC TUNING OF A PROPORTIONAL-INTEGRAL-DERIVATIVE CONTROLLER FOR DC-DC BUCK SWITCHING POWER CONVERTER

CROSS-REFERENCE TO RELATED APPLICATIONS

This application is a National Stage Application of International Patent Application No. PCT/IB2021/055825 filed Jun. 29, 2021, which claims priority under Article 8 of the Patent Cooperation Treaty to U.S. Provisional Patent Application 63/045,469 filed in the Unites States Patent and Trademark Office on Jun. 29, 2020, the entire disclosure of each of which is hereby incorporated by reference.

FIELD OF INVENTION

The present invention relates to systems and methods for automatically tuning a proportional-integral-derivative (PID) controller for DC-DC buck switching power converter.

BACKGROUND

Fueled by the development of low-cost microcontrollers with high clock speeds, the autotuning of digitally-controlled DC-DC switched-mode converters has attracted the attention of researchers in the last two decades. Even though analog controllers are still faster and cost less, the digital controller offers some unmatched advantages such as the immunity to controller parameter variation, the ease of retuning the controller, and the ability to implement highly sophisticated control algorithms.

Autotuning in the present context refers to the automatic online tuning of a digital controller at pre-set intervals or in response to a user command or a triggering event. Because components in converters have a tolerance and so their exact values are unknown, and because they are prone to ageing, the ability of a controller to retune itself based on actual system parameters rather than a nominal mathematical model can largely improve the stability and dynamic performance of a converter. Autotuning generally includes a test stage in which the system dynamics are excited, and a tuning stage in which the controller is retuned using measurements from the test. Some autotuning methods use an intermediate stage of system identification.

The relay feedback test (RFT) is classically known in the field of control. It involves placing a relay in series with the plant or process, and operating the system in closed-loop, which leads to limit-cycle oscillations occurring at the phase cross-over (−180°) frequency of the plant. The amplitude and time period of the oscillations are measured and used for tuning a PID controller, for example, using the Ziegler and Nichols (Z-N) PID tuning rules. While this usually yields satisfactory performance, stability is not guaranteed, nor are gain or phase margin be specified. A form of RFT-based autotuning of a DC-DC buck converter has been previously implemented. However, different from the conventional RFT, an integrator is placed in series with the RFT relay. This forces oscillations at a frequency corresponding to a −90° phase shift, thereby identifying the LC resonant frequency of the converter. The first PID zero is placed at the resonant frequency, while the other zero is iteratively tuned until the desired phase margin is met. The PID gain is finally tuned (iteratively) to achieve the desired bandwidth. A disadvantage of this method is that since oscillation amplitude is large at the resonant frequency, the test is performed at a voltage below the nominal, during the startup ramp. This means autotuning must be performed during regular operation. Also, the tuning process is somewhat complex and long as it consists of several stages, some with iterations. In other prior implementations, an improvement to the same RFT-based work has been developed in which only time-period measurements are used in order to avoid errors related to amplitude measurement. In other prior art, limited-cycle oscillations are induced in a DC-DC buck converter by temporarily reducing the resolution of the digital PWM rather than using a relay, which allows for continued regulation of the system even during the test stage, although with poorer tracking.

Several other autotuning methods using tests besides RFT have also been implemented, for example, methods that use the injection of a pseudo-random binary sequence (PRBS) in the test stage. But almost all known methods, whether based on the RFT, PRBS injection, or others, have some level of complexity, mainly because the full burden of test and tuning is to be done online. One way to simplify the test and tuning stages, and thus make them more suitable for practical implementation, is to utilize general knowledge of the system's behavior to do part of the tuning preparation offline. The modified relay feedback test (MRFT) autotuning method is one such method. It is built on a coordinated test and tuning concept that guarantees a specified gain margin or phase margin. Further, the MRFT autotuning method can also be extended to include optimized non-parametric tuning, which in addition to the guaranteed gain or phase margin, provides near-optimal transient performance for a wide range of designs of a given system. The MRFT autotuning method consists of a single-step test and a single-step tuning stage, which are described below.

TEST STAGE: A general block diagram of the test stage of the MRFT autotuning method is shown in FIG. 1a, where $W_p(s)$ is the transfer function of the plant to be controlled. The logic of the MRFT block is given below, where e(t) is the error signal and u(t) is the control command produced by the MRFT block. u(t−) is the control output immediately prior to the time t. $b_1$ and $b_2$ are the relay switching conditions, given by $b_1 = -\beta e_{min}$ and $b_2 = \beta e_{max}$, where $e_{min}$ and $e_{max}$ are the last (negative) minimum and last (positive) maximum of e(t), respectively, and where β is a "threshold parameter" of the test set by the user in the range −1<β<1.

$$u(t) = \begin{cases} +h, \text{ if} & \{e(t) \geq b_1 \ \& \ u(t-) = -h\} \\ & \text{or} \\ & \{e(t) \geq -b_2 + u(t-) = +h\} \\ -h, \text{ if} & \{e(t) \leq -b_2 \ \& u(t-) = +h\} \\ & \text{or} \\ & \{e(t) \leq b_1 \ \& u(t-) = -h\} \end{cases} \quad \text{Eq. (1)}$$

h is the "MRFT magnitude", which is the amount of the control effort provided by the MRFT block to the process, or in other words the command provided to the actuator. The test stage of MRFT autotuning method is performed when the subject system is in steady-state. FIG. 1b shows illustrative waveforms of the test stage. $e_{max}$ and $e_{min}$ are initially set to zero, making $b_1 = b_2 = 0$. Oscillations start to develop in the output y(t), and consequently in error signal e(t). Every time a minimum ($e_{min}$) or maximum ($e_{max}$) is recorded, the switching condition ($b_1$ or $b_2$) for the upcoming half-cycle is updated. After a few transient cycles, the oscillations stabilize, and $|e_{max}|$ and $|e_{min}|$ are equal. This is when amplitude and frequency measurements are taken. Let $\Omega_0$ (in rad/s) be the frequency of the resulting oscillations and let $a_0=e_{max}=-e_{min}$ be the amplitude of the oscillations. $T_u=2\pi/\Omega_0$ is called the ultimate time period. For improved accuracy, $T_u$ and $a_0$ are best computed as an average over a few oscillation cycles. The ultimate gain $K_u$ refers to the gain from the fundamental component of e(t) to the fundamental component of u(t). In other words, it is the ratio of the amplitudes of the first harmonics of u(t) and e(t) and is calculated using the equation below.

$$K_u = \frac{4h}{\pi a_0} \quad \text{Eq. (2)}$$

TUNING STAGE: A PID controller of the format $$W_c(s) = K_c\left(1 + \frac{1}{T_i s} + T_d s\right)$$

is used in the MRFT autotuning method. The tuning stage is to simply calculate the updated PID parameters using the following equations, where $c_1$, $c_2$, $c_3$ are predetermined constants:

$$K_c = c_1 K_u, T_i = c_2 T_u, T_d = c_3 T_u \quad \text{Eq. (3)}$$

SUMMARY

According to one or more aspects of the present disclosure, a method of automatically tuning a digitally-implemented proportional-integral-derivative (PID) controller for the purpose of controlling a DC-DC buck switching power converter includes the steps of
a) Using a PID controller of the form $$W_c(s) = K_c\left(1 + \frac{1}{T_i s} + T_d s\right),$$

where s is the Laplace variable, $K_c$ is the proportional gain, $T_i$ is the integral time, and $T_d$ is the derivative time, to drive the system to a steady state;
b) substituting the PID controller with a modified relay feedback test (MRFT) block;
c) the input to the MRFT block is an error signal (e[k]), which is obtained by measuring an output voltage ($V_o$[k]) of the DC-DC buck switching power converter and comparing it to a desired reference output voltage ($V_{o-ref}$);
d) the output of the MRFT block is the new modulation index that is input to the pulse-width modulator (PWM); the MRFT block output is set to either D+h or D−h, where D is the nominal duty cycle, i.e., the modulation index that is normally provided by the PID controller to the pulse-width modulator (PWM) to produce an output voltage equal to the set point ($V_{o-ref}$); This is in contrast to the prior implementations of the MRFT in prior art, where the output of the MRFT block is only +h or −h.
e) repeating steps a) through c) until a number of cycles ($N_{cycles}$) of sustained oscillations are produced;
f) measuring the frequency ($\Omega_0$) and amplitude ($a_0$) of the sustained oscillations resulting from the application of the MRFT, where $a_0$ is the incremental amplitude around the steady-state output voltage; for improved accuracy, $\Omega_0$ and $a_0$ are taken as an average over several cycles of MRFT oscillations;
g) updating the PID controller parameters based on the measured $\Omega_0$ and $a_0$; using the following equations $$K_c = c_1\frac{4h}{\pi a_0}, T_i = c_2\frac{2\pi}{\Omega_0}, T_d = c_3\frac{2\pi}{\Omega_0};$$

and
h) replacing the MRFT block back with the PID controller.

In one or more embodiments of the method according to any one of the previous paragraphs, the threshold parameter of the MRFT block is given by $\beta=-0.2\pm5\%$.

In one or more embodiments of the method according to any one of the previous paragraphs, $c_1=0.69\pm5\%$, $c_2=1.14\pm5\%$, and $c_3=0.19\pm5\%$.

According to one or more aspects of the present disclosure a non-transitory computer readable storage medium has data stored therein representing software executable by a computer. The software includes instructions to switch a controller circuit of a DC-DC buck switching power converter from a proportional-integral-derivative (PID) controller to an MRFT block; determine an error signal (e[k]) by measuring an output voltage ($V_o$[k]) of the DC-DC buck switching power converter and comparing it to a desired reference output voltage ($V_{o-ref}$); input the error signal (e[k]) to the MRFT block; depending on the value of e[k], the MRFT block will output either D+h or D−h, where D is the nominal duty cycle described earlier and h is the MRFT magnitude; repeat the preceding instructions until a predetermined number of oscillation cycles ($N_{cycles}$) have developed; measure a frequency ($\Omega_0$) and amplitude ($a_0$) of the oscillations as an average over the $N_{cycle}$ oscillations, but disregarding an initial number of cycles ($N_{discard}$); update the PID controller parameters based on $\Omega_0$ and $a_0$ using the equations $$K_c = c_1\frac{4h}{\pi a_0}, T_i = c_2\frac{2\pi}{\Omega_0}, T_d = c_3\frac{2\pi}{\Omega_0};$$

and finally switch the controller circuit of the DC-DC buck switching power converter from the MRFT block back to the (updated) PID controller.

In one or more embodiments of the non-transitory computer readable storage medium according to any one of the previous paragraphs, the software further includes instructions to continuously track the error signal (e[k]) and record every occurring maximum ($e_{max}$) and minimum ($e_{min}$).

In one or more embodiments of the non-transitory computer readable storage medium according to any one of the previous paragraphs, the software further includes instructions to measure the frequency ($\Omega_0$) and amplitude ($a_0$) of the oscillations as an average based on a number of recorded cycles ($N_{MRFT}$)—which equals a total number of cycles ($N_{cycles}$) minus the initial number of cycles ($N_{discard}$)—and an elapsed time period ($T_{MRFT}$) of the number of recorded cycles ($N_{MRFT}$); $\Omega_0$ and $a_0$ are then calculated using $$\Omega_0 = \frac{2\pi}{\frac{T_{MRFT}}{N_{MRFT}}} \text{ and } a_0 = \frac{\sum_{N_{MRFT}} e_{max} + \sum_{N_{MRFT}} |e_{min}|}{2N_{MRFT}}.$$

In one or more embodiments of the non-transitory computer readable storage medium according to any one of the previous paragraphs, the software further includes instructions to update the PID controller parameters based on the amplitude ($a_0$) where $$a_0 = \frac{\sum_{N_{MRFT}} e_{max} + \sum_{M_{MRFT}} |e_{min}|}{2N_{MRFT}}.$$

In one or more embodiments of the non-transitory computer readable storage medium according to any one of the previous paragraphs, the software further includes instructions to calculate a proportional gain ($K_c$), $T_i$ an integral time ($T_i$), and a derivative time ($T_d$) for the PID controller, where:

$$K_c = c_1 \frac{4h}{\pi a_0}, \; T_i = c_2 \frac{2\pi}{\Omega_0}, \; T_d = c_3 \frac{2\pi}{\Omega_0}.$$

In one or more embodiments of the non-transitory computer readable storage medium according to any one of the previous paragraphs, the non-transitory computer readable storage medium has data stored therein representing a value of $C_1$ as 0.69±5%, a value of $c_2$ as 1.14±5%, and a value of $c_3$ is 0.19±5%.

In one or more embodiments of the non-transitory computer readable storage medium according to any one of the previous paragraphs, the non-transitory computer readable storage medium has data stored therein representing a value of $\beta$ as −0.2±5%.

DESCRIPTION OF THE DRAWINGS

The present invention will now be described, by way of example with reference to the accompanying drawings, in which:

FIG. 6a, is tuned using an optimal but non-autotuning method;

FIG. 7a, is tuned using an optimal but non-autotuning method;

FIG. 8a, is tuned using an optimal but non-autotuning method;

FIG. 9a, is tuned using an optimal but non-autotuning method;

FIG. 10a, is tuned using an optimal but non-autotuning method;

FIG. 11a, is tuned using an optimal but non-autotuning method;

FIG. 12a, is tuned using an optimal but non-autotuning method;

FIG. 13a, is tuned using an optimal but non-autotuning method.

DETAILED DESCRIPTION

Figure 1A:
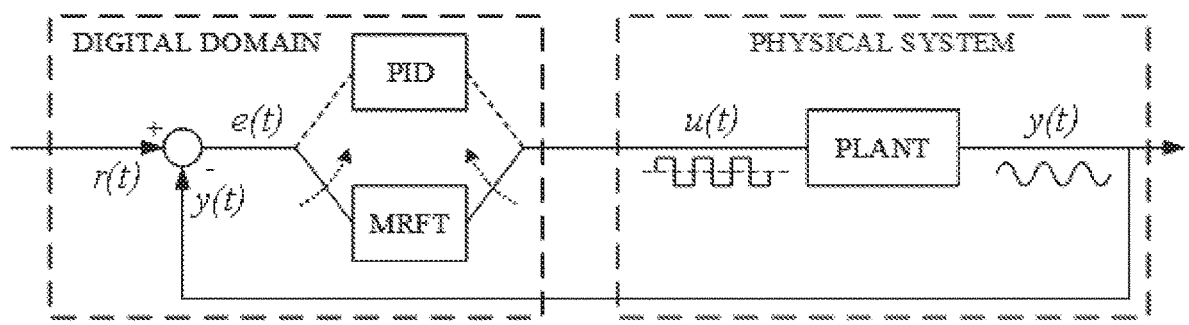
FIG. 1a shows a schematic block diagram of the MRFT (which represents the test stage of the MRFT autotuning method) according to the prior art.
Figure 1B:
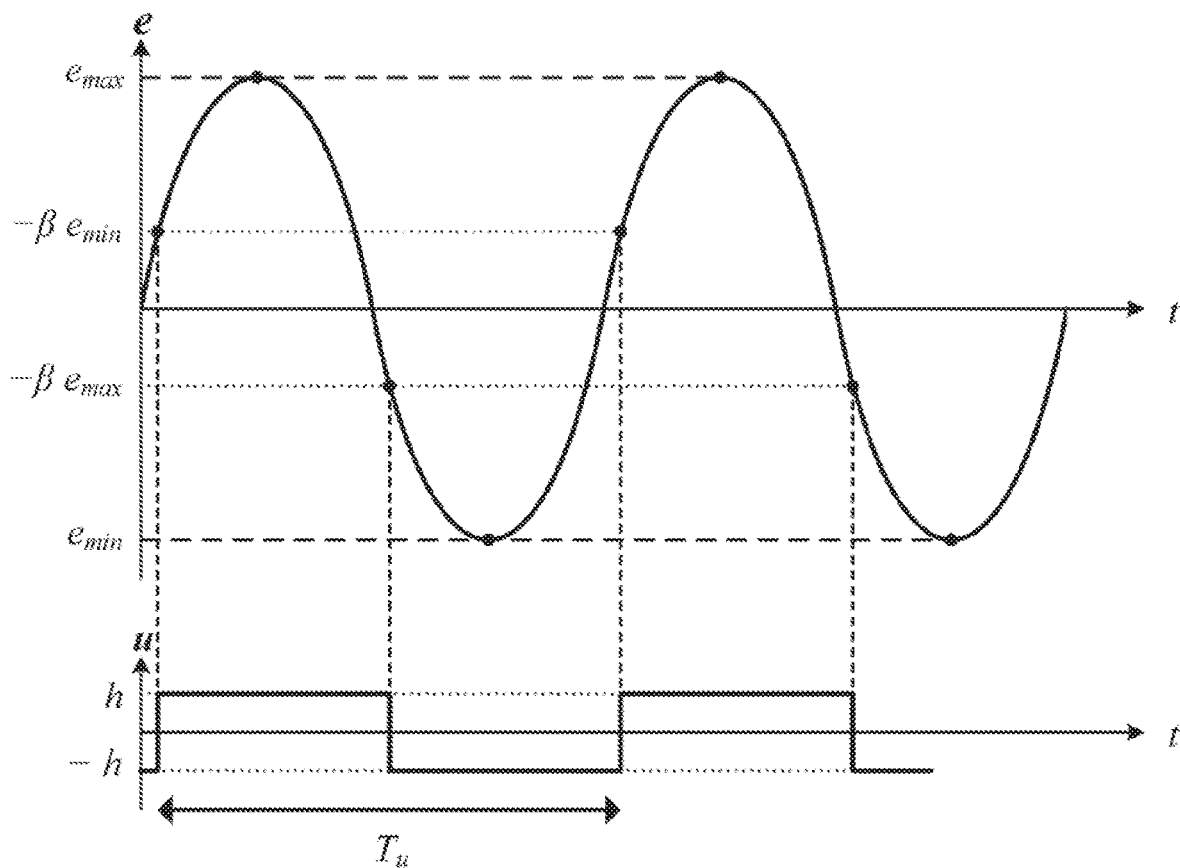
FIG. 1b shows illustrative waveforms of the operation of the MRFT according to the prior art.

A method of autotuning a PID controller 102 of a DC-DC switching buck converter 100 using the modified relay feedback test (MRFT) is provided. The method is comprised of two components, which are:

- a procedure for implementing the test stage of the MRFT autotuning method on a digitally-controlled DC-DC pulse-width modulated buck converter; and
- PID controller tuning rules that provide near-optimal performance for virtually any DC-DC buck converter. The tuning rules also provide a desired phase margin.

In the context of the DC-DC converter, a direct implementation of the original MRFT autotuning method would be to disable the DPWM and let the MRFT directly control the converter switches, so that when the MRFT block output is +h, the main switch is turned ON, and when the relay is −h, the main switch is turned OFF. But since the MRFT frequency is typically much lower than the DPWM frequency, switching at the MRFT frequency will result in an increased ripple in both the inductor current and the output voltage. The present invention adopts a more appropriate approach of double-modulation, where the DPWM is still maintained during the test stage, and the MRFT modulation is superposed on top of it. This is done by setting the MRFT block output, u(t), to either D+h or D−h instead of +h or −h, where D is the nominal duty-cycle, i.e., the modulation index that is normally provided by the PID controller to the DPWM to produce an output voltage equal to the set point ($V_{o\text{-}ref}$). In such approach, the MRFT oscillations appear superposed on top of the nominal output voltage. In terms of gate pulses, the MRFT manifests as a series of slightly wider PWM pulses corresponding to the D+h duty-cycle and lasting for $T_u/2$, followed by a series of slightly narrower PWM pulses corresponding to the D−h duty-cycle and also lasting for $T_u/2$, where $T_u$ is the time period of the MRFT oscillations. The advantage of the adopted approach is that the converter maintains the switching frequency it was designed for even during the test stage, thus maintaining an acceptable level of ripple. This minimizes the impact of the MRFT autotuning on the converter, making it possible to take place even during normal operation (in most applications).

The algorithm of the MRFT block in such approach is expressed as below:

$$u(t) = \begin{cases} D+h, \text{ if } & \begin{array}{l} \{e(t) \geq -\beta e_{min} \, \& \, u\,(t-) = D-h\} \\ \text{or} \\ \{e(t) \geq -\beta e_{max} \, \& \, u\,(t-) = D+h\} \end{array} \\ D-h, \text{ if } & \begin{array}{l} \{e(t) \leq -\beta e_{max} \, \& \, u\,(t-) = D+h\} \\ \text{or} \\ \{e(t) \leq -\beta e_{min} \, \& \, u\,(t-) = D-h\} \end{array} \end{cases}$$

The MRFT tuning method can be initiated upon user prompt or programmed by the user in accordance with a certain schedule or event. The MRFT tuning method only lasts for a short duration (typically less than 1 millisecond). The inputs required by the MRFT tuning method routine are:

- β is a threshold parameter that determines the amount of hysteresis in the modified relay;
- h is the desired magnitude of the relay (to be added to steady-state duty-cycle);
- $N_{discard}$ is the number of initial MRFT oscillation cycles to be neglected in calculating amplitude and frequency of oscillations;
- $N_{MRFT}$ is the number of MRFT oscillation cycles to be run after the first $N_{discard}$ cycles; and
- $N_{cycles}$ is the total number of MRFT oscillation cycles per single run of the test. Thus, $N_{cycles}=N_{discard}+N_{MRFT}$.

Next, the MRFT tuning method data that needs to be recorded for post-processing is as follows:

- All minimums and maximums of an error signal for duration of the test stage of the MRFT autotuning method; and
- $T_{MRFT}$ is the time duration for the last $N_{MRFT}$ cycles only, i.e., not including the time duration of the initial $N_{discard}$ cycles.
- The complete error signal waveform for duration of the MRFT tuning method is optionally recorded.
- The complete relay signal waveform for duration of the MRFT tuning method is optionally recorded.

Figure 2:
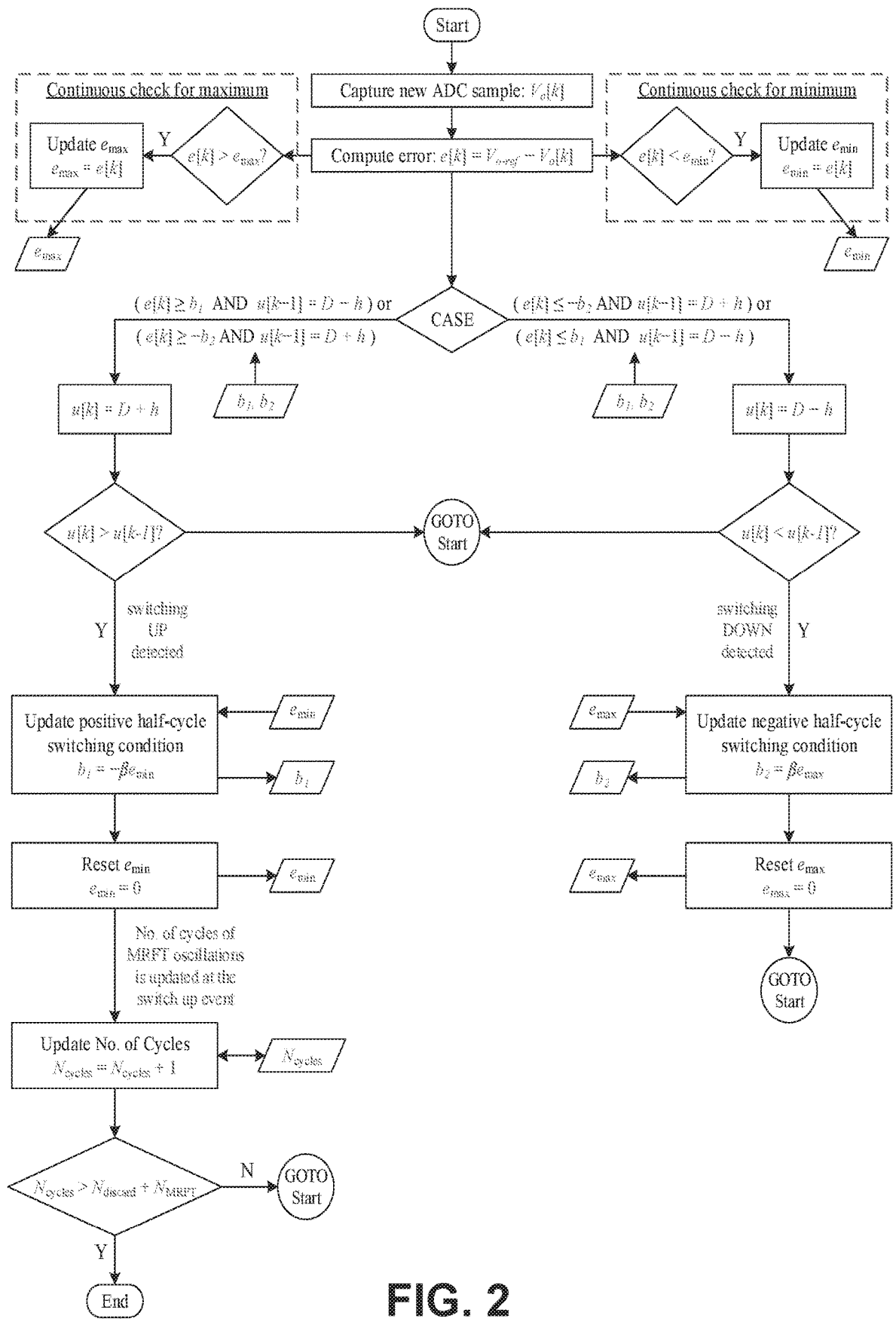
FIG. 2 shows a flowchart for an implementation of the MRFT test stage on a DC-DC switching buck converter according to some embodiments.

The MRFT tuning method is then executed per the algorithm in the flowchart shown in FIG. 2. After the MRFT tuning method is completed, the following post-processing calculations are carried out:

$$T_u = \frac{T_{MRFT}}{N_{MRFT}}$$

is calculated. This is the time period of the MRFT oscillations (referred to as the ultimate time period). It is calculated as the average time period over the last $N_{MRFT}$ cycles (i.e., not including the first $N_{discard}$ cycles).

$$a = \frac{\sum_{N_{MRFT}} e_{max} + \sum_{N_{MRFT}} |e_{min}|}{2N_{MRFT}} \rightarrow$$

is calculated. This is the average amplitude of the MRFT oscillations, calculated using the (absolute value of) all minimums and maximums over the last $N_{MRFT}$ cycles.

A validity check on the error waveform may optionally be conducted to check if it contains many noise spikes or highly irregular oscillations. The test may be repeated if deemed necessary.

The above procedure represents the test stage, which is first of two steps of the MRFT tuning method. The second and final step is the tuning stage, which is to update the PID controller parameters using the test results. A PID controller of the following form is used, where $K_c$ is the proportional gain, $T_i$ the integral time, and $T_d$ the derivative time.

$$W_c(s) = K_c \left(1 + \frac{1}{T_i s} + T_d s\right) \quad \text{Eq. (3)}$$

Tuning rules of the following form are used, where coefficients $c_1$, $c_2$, and $c_3$, are positive constants.

$$K_c = c_1 K_u = c_1 \frac{4h}{\pi a_0}, \, T_i = c_2 T_u = c_2 \frac{2\pi}{\Omega_0}, \, T_d = c_3 T_u = c_3 \frac{2\pi}{\Omega_0} \quad \text{Eq. (4)}$$

According to the MRFT autotuning method, selecting $c_1$, $c_2$, and $c_3$, and the threshold parameter $\beta$ of the MRFT in coordination with each other as per the following constraints would provide a user-specified phase margin, $\phi_m$, for any arbitrary system.

$$c_1 \sqrt{1 + \xi^2} = 1 \quad \text{Eq. (5)}$$

$$\beta = \sin(\phi_m - \tan^{-1}\xi), \text{ where } \xi = 2\pi c_3 - \frac{1}{2\pi c_2}$$

Further to this, using a two-stage optimization technique, the set ($\beta$, $c_1$, $c_2$, $c_3$) is chosen so that it provides near-optimal transient performance for a wide range of DC-DC buck converters. Details of the optimization procedure used to obtain the optimized tuning rules is provided later. The optimized set ($\beta^*$, $c_1^*$, $c_2^*$, $c_3^*$), is given below.

$$\beta^* = -0.2 \pm 5\%, c_1^* = 0.69 \pm 5\%, c_2^* = 1.14 \pm 5\%,$$
$$c_3^* = 0.19 \pm 5\% \quad \text{Eq. (6)}$$

Figure 3:
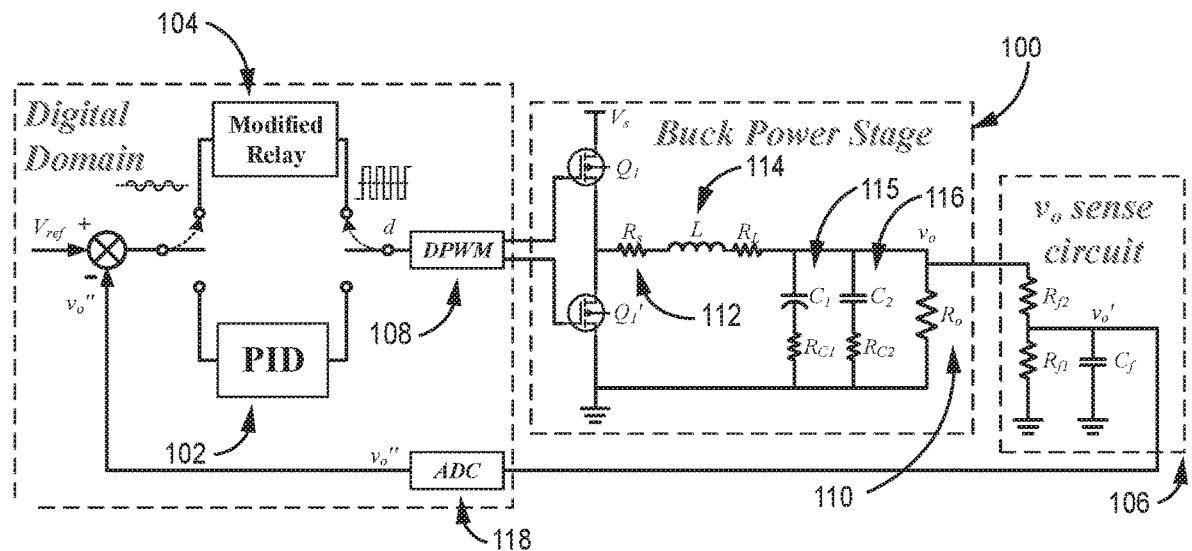
FIG. 3 shows a schematic block diagram of the MRFT block with the DC-DC switching buck converter according to some embodiments.

Referring to the example application shown in FIG. 3, a digitally controlled synchronous DC-DC buck converter 100, operating in voltage-control mode, is used for the implementation of the MRFT tuning method. A full schematic of the system is illustrated in FIG. 3. The output voltage ($v_o$) goes through a sensing circuit 106 that includes a voltage step-down circuit and an anti-aliasing filter.

A digital microcontroller, e.g., Texas Instruments TMS320F28335, is used for sampling and control. The microcontroller includes non-transitory memory containing software instructions to perform the steps of the method described herein. The microcontroller also includes transitory memory containing data generated by the method described herein.

The switching frequency ($f_s = 1/T_s$) of the digital pulse width modulator (DPWM) 108 is set to 200 kHz. The sampling rate is also set to 200 kHz and is synchronized with the PWM. The resistive load ($R_o$) 110 can be electronically switched between two values to provide load transients for controller testing. The resistor $R_s$ 112 is used to sense the inductor current ($I_L$) through the inductor L 114 for protection purposes. The output filter capacitance consists of a parallel combination of two larger aluminum polymer low equivalent series resistance (ESR) capacitors (together forming capacitance $C_1$) 115 and three smaller ceramic capacitors (together forming capacitance $C_2$) 116. $R_L$, $R_{C1}$, and $R_{C2}$ are the parasitic resistances of L, $C_1$, and $C_2$, respectively. Nominal input supply voltage ($V_s$) is 9 V while the set-point output voltage ($V_{o-ref}$) is 2 V.

Figure 4:
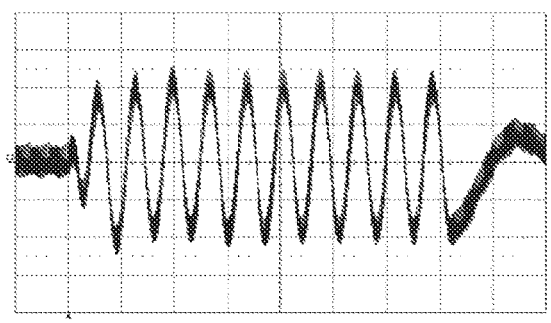
FIG. 4 shows a graph of oscillations resulting from the application of the MRFT to a DC-DC switching buck converter, using scales of 20 mV/division for the vertical axis and 200 μs/division for the horizontal axis, according to some embodiments.
Figure 5:
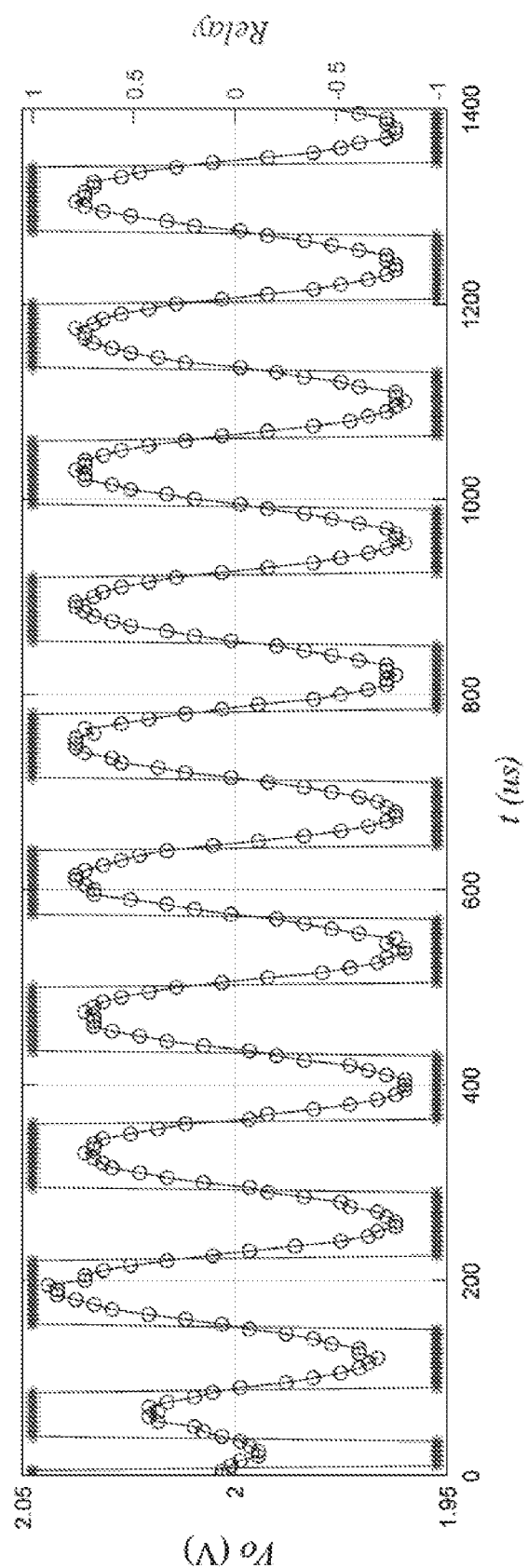
FIG. 5 shows a graph of oscillations resulting from the application of the MRFT to a DC-DC switching buck converter overlaid on the relay status according to some embodiments.
Figure 6B:
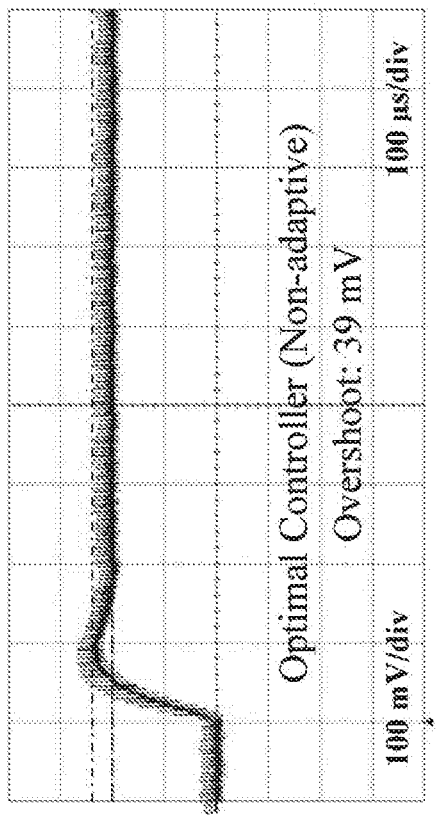
FIG. 6b shows a transient response of the output voltage of a DC-DC switching buck having the same inductance and capacitance values as in FIG. 6a and for the same step in set-point like in FIG. 6a, but where the PID controller of the converter, unlike
Figure 6A:
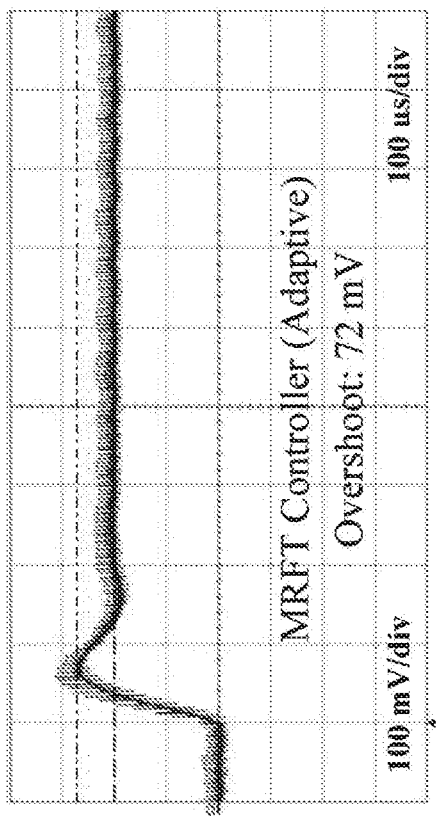
FIG. 6a shows the transient response of the output voltage of a DC-DC switching buck converter due to a step in the commanded set-point voltage from 2V to 2.2V, where the converter has an inductance value of 10 μH and a capacitance value of 660 μF, and where the PID controller of the converter is tuned with the MRFT autotuning method, according to some embodiments.
Figure 7B:
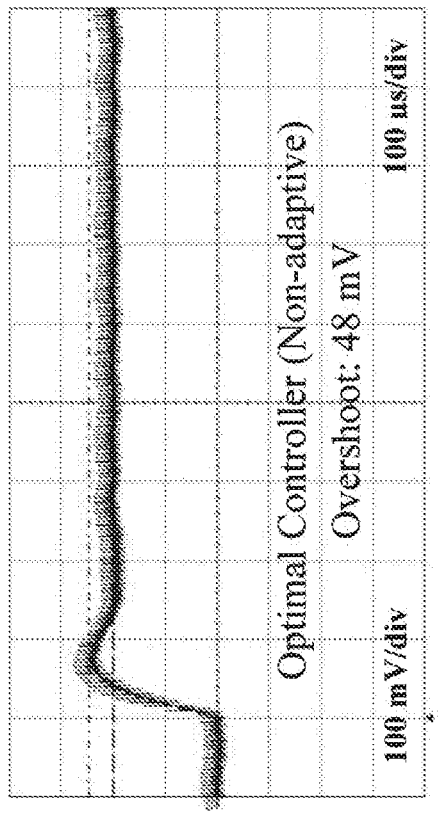
FIG. 7b shows a transient response of the output voltage of a DC-DC switching buck having the same inductance and capacitance values as in FIG. 7a and for the same step in set-point like in FIG. 7a, but where the PID controller of the converter, unlike
Figure 7A:
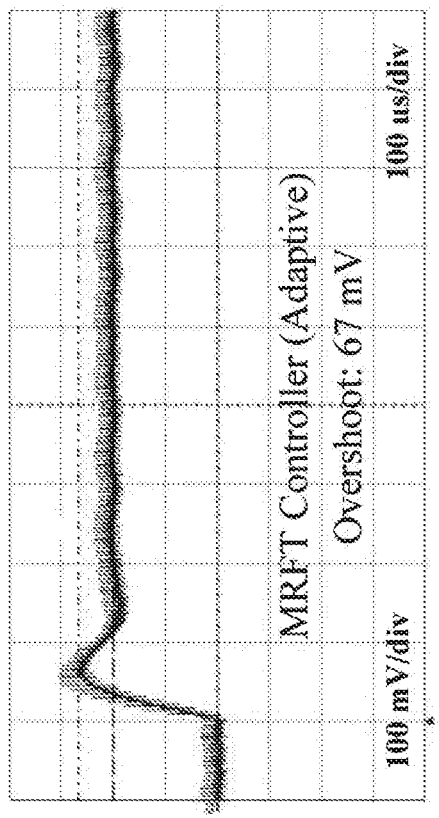
FIG. 7a shows the transient response of the output voltage of a DC-DC switching buck converter due to a step in the commanded set-point voltage from 2V to 2.2V, where the converter has an inductance value of 10 μH and a capacitance value of 440 μF, and where the PID controller of the converter is tuned with the MRFT autotuning method, according to some embodiments.

For the first test setup, L=4.8 µH and $C_1$=440 µF are used (where $C_1$ is formed using two parallel 220 µF capacitors for lower ESR). The MRFT tuning method is performed using the optimized $\beta$ in Eq. (6). The experimentally measured oscillations in $v_o$ are shown in FIG. 4. The digital controller is programmed to discard the first few cycles when taking measurements of $T_u$ and $a_0$, since as seen from FIG. 4 the oscillations stabilize after a short transient of one or two cycles. It is also noted that the amplitude of oscillations is relatively low (only ±0.04 V around the 2 V steady state, i.e., 2%). Such small magnitude of the oscillations, as well as the need for only a few oscillation cycles, makes the MRFT method's effect on a converter's operation minimal. The same oscillations of FIG. 4 but recorded in the microcontroller memory as contiguous digital conversion samples taken by the Analog to Digital Converter (ADC) 118 (see FIG. 3), are shown in FIG. 5. Also shown superposed in FIG. 5 is a plot of the relay's output, where +1 (relay ON) indicates that h is added to the steady-state controller output, while −1 (relay OFF) indicates that h is subtracted from the steady-state controller output. It is noted that the sampled ADC signal shown in FIG. 5, upon which the control action is based, is much cleaner than that shown in the graph of FIG. 4. This is achieved by sampling between switch transitions to avoid switching noise spikes and is also partially due to the filtering provided by the anti-aliasing low pass filter (LPF) 106.

Immediately following the first stage of the MRFT method, the new PID controller coefficients are calculated. $K_u$ is obtained from Eq. (2) using the measured amplitude $a_0$, and it is used along with the frequency $\Omega_0 = 2\pi/T_u$ to calculate the PID controller coefficients using Eq. (4) and ($c_1$, $c_2$, $c_3$) from Eq. (6). $T_u$ for this example application (using a DC-DC buck converter with L=4.8 µH and $C_1$=440 µF) was 138 µs, while the $K_u$ based on the measured $a_0$ was 11.4 $V^{-1}$.

This same test stage of the MRFT autotuning method was repeated using the same example converter referred above but with different values of L and $C_1$. For each design, two tests are conducted to test the MRFT auto-tuned controller's performance: In the first test, a step in $V_{o-ref}$ from 2 V to 2.2 V is applied, while in the second test a step in the output current ($I_o$) from 0.27 A to 1.27 A is applied.

TABLE 1

Controller Parameters for MRFT Auto-Tuned and Optimized Controllers

| Design # | | Controller Type | $K_c$ | $T_i$ (µs) | $T_d$ (µs) |
|---|---|---|---|---|---|
| 1 | L = 10 µH $C_1$ = 660 µF | MRFT (Adaptive) | 10.5 | 150 | 25 |
| | | Optimized (Non-adaptive) | 7.3 | 193 | 36 |

TABLE 1-continued

Controller Parameters for MRFT Auto-Tuned and Optimized Controllers

| Design # | | Controller Type | $K_c$ | Ti (μs) | $T_d$ (μs) |
|---|---|---|---|---|---|
| 2 | $L = 10\ \mu H$<br>$C_1 = 440\ \mu F$ | MRFT (Adaptive) | 7.9 | 157 | 26 |
| | | Optimized (Non-adaptive) | 5.6 | 145 | 35 |
| 3 | $L = 4.8\ \mu H$<br>$C_1 = 660\ \mu F$ | MRFT (Adaptive) | 4.6 | 100 | 17 |
| | | Optimized (Non-adaptive) | 4.8 | 132 | 16 |
| 4 | $L = 4.8\ \mu H$<br>$C_1 = 440\ \mu F$ | MRFT (Adaptive) | 3.7 | 96 | 16 |
| | | Optimized (Non-adaptive) | 4.3 | 105 | 16 |

For comparison, another PID controller that is tuned optimally for each of the specific converter designs is used. This optimized controller is obtained using the following procedure. Experimentally measured frequency response data of the buck converter system is obtained with the aid of a software frequency response analyzer (SFRA) tool, such as that produced by Texas Instruments Incorporated, and a high order transfer function (TF) is fitted to the measured frequency response data. Using this fitted model, a controller that gives the lowest integral of time-weighted absolute error (ITAE) (in simulation) for a step in $V_{o\text{-}ref}$ for this TF is obtained through optimization using a processes of finding a minimum of an unconstrained multivariable function using a derivative-free method, e.g., the fminsearch function in MATLAB® available from MathWorks, Inc. Note that this optimized controller differs from the MRFT block in that it 1) is optimized only for a given converter design and cannot be retuned to any other converter, and 2) does not guarantee a specific gain or phase margin.

Figure 8B:
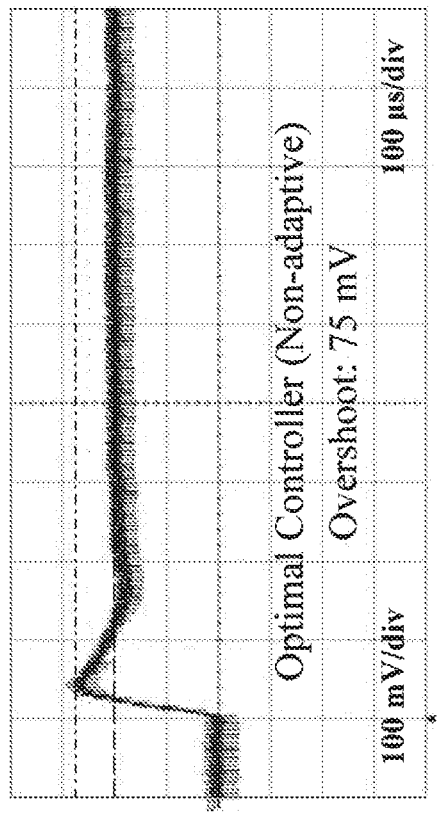
FIG. 8b shows a transient response of the output voltage of a DC-DC switching buck having the same inductance and capacitance values as in FIG. 8a and for the same step in set-point like in FIG. 8a, but where the PID controller of the converter, unlike
Figure 8A:
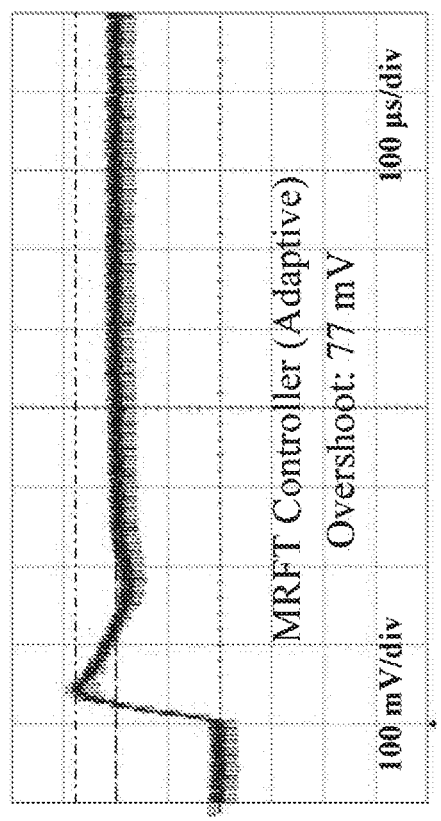
FIG. 8a shows the transient response of the output voltage of a DC-DC switching buck converter due to a step in the commanded set-point voltage from 2V to 2.2V, where the converter has an inductance value of 4.8 μH and a capacitance value of 660 μF, and where the PID controller of the converter is tuned with the MRFT autotuning method, according to some embodiments.
Figure 9B:
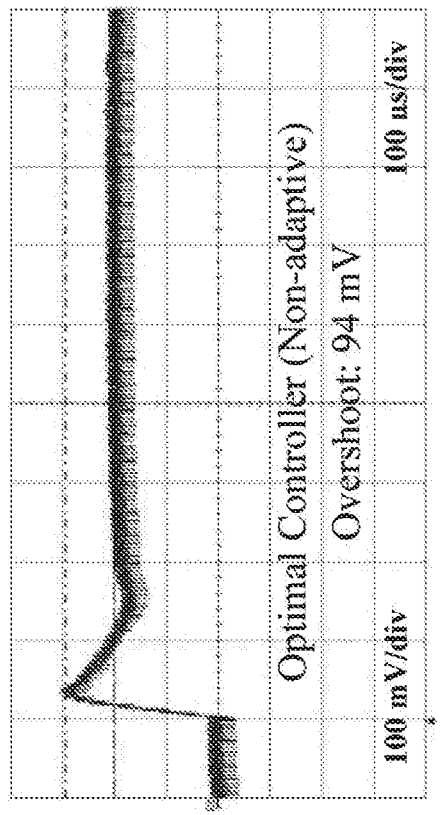
FIG. 9b shows a transient response of the output voltage of a DC-DC switching buck having the same inductance and capacitance values as in FIG. 9a and for the same step in set-point like in FIG. 9a, but where the PID controller of the converter, unlike
Figure 9A:
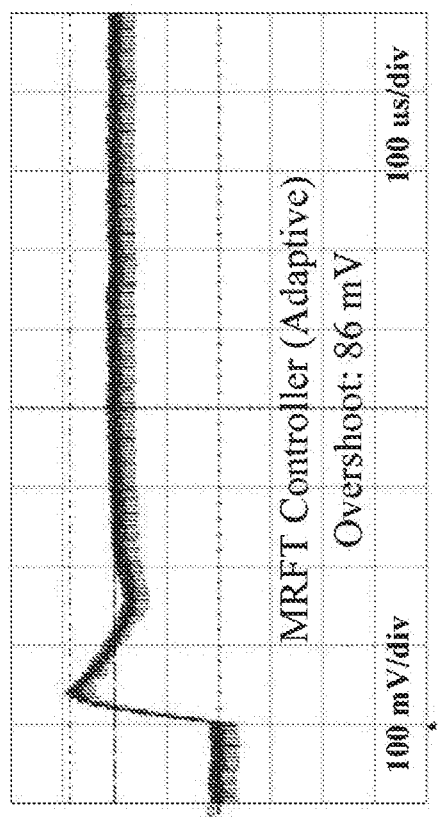
FIG. 9a shows the transient response of the output voltage of a DC-DC switching buck converter due to a step in the commanded set-point voltage from 2V to 2.2V, where the converter has an inductance value of 4.8 μH and a capacitance value of 440 μF, and where the PID controller of the converter is tuned with the MRFT autotuning method, according to some embodiments.
Figures 10A, 10B:
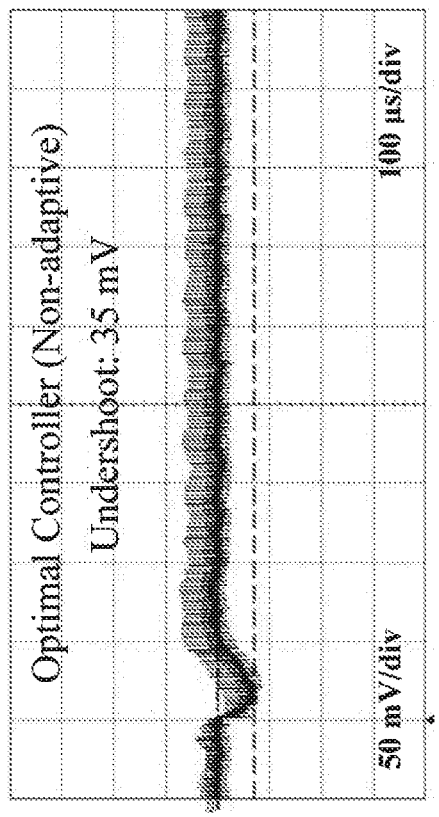
FIG. 10a shows the transient response of the output voltage of a DC-DC switching buck converter due to a step in the load current from 0.27 A to 1.27 A, where the converter has an inductance value of 10 μH and a capacitance value of 660 μF, and where the PID controller of the converter is tuned with the MRFT autotuning method, according to some embodiments.
FIG. 10b shows a transient response of the output voltage of a DC-DC switching buck having the same inductance and capacitance values as in FIG. 10a and for the same step in load current like in FIG. 10a, but where the PID controller of the converter, unlike
Figure 11B:
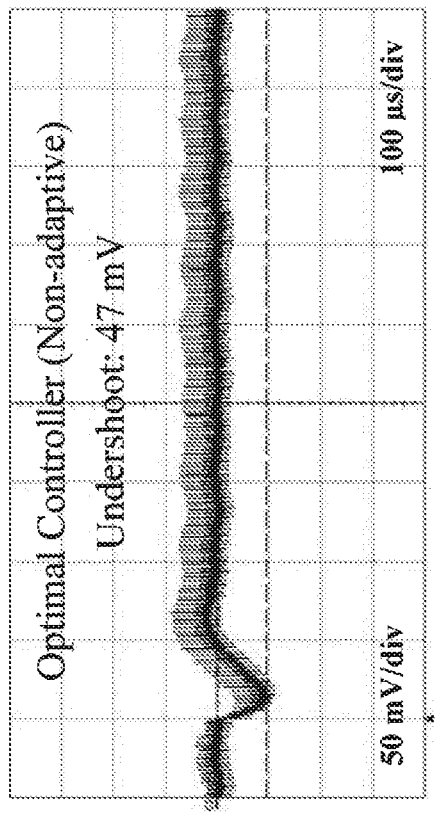
FIG. 11b shows a transient response of the output voltage of a DC-DC switching buck having the same inductance and capacitance values as in FIG. 11a and for the same step in load current like in FIG. 11a, but where the PID controller of the converter, unlike
Figure 11A:
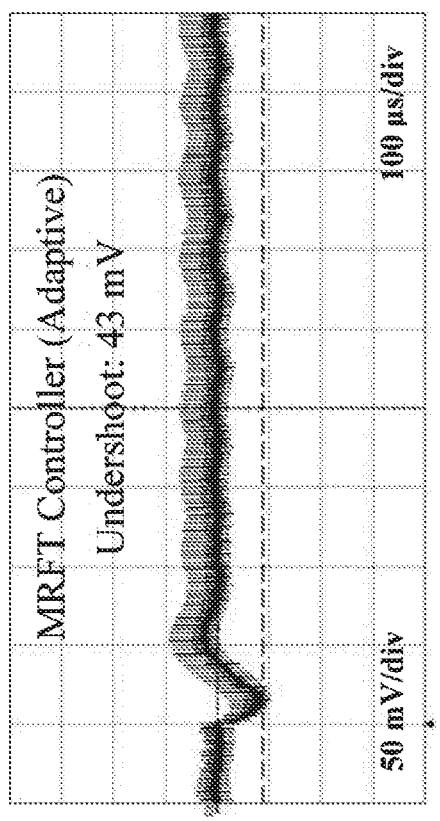
FIG. 11a shows the transient response of the output voltage of a DC-DC switching buck converter due to a step in the load current from 0.27 A to 1.27 A, where the converter has an inductance value of 10 μH and a capacitance value of 440 µF, and where the PID controller of the converter is tuned with the MRFT autotuning method, according to some embodiments.
Figure 12B:
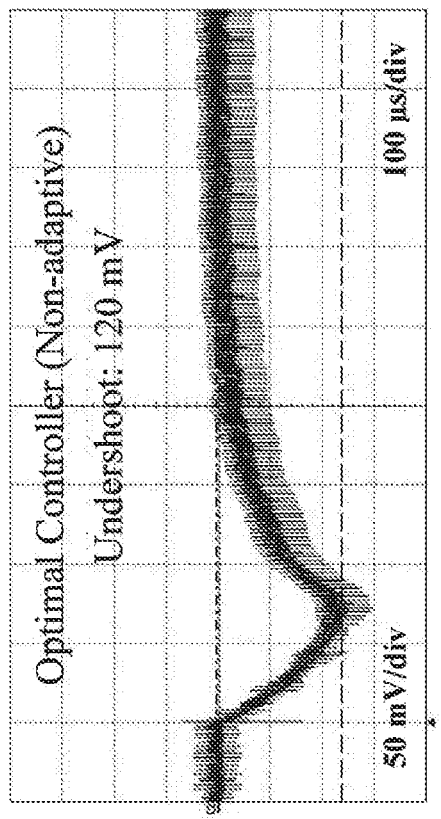
FIG. 12b shows a transient response of the output voltage of a DC-DC switching buck having the same inductance and capacitance values as in FIG. 12a and for the same step in load current like in FIG. 12a, but where the PID controller of the converter, unlike
Figure 12A:
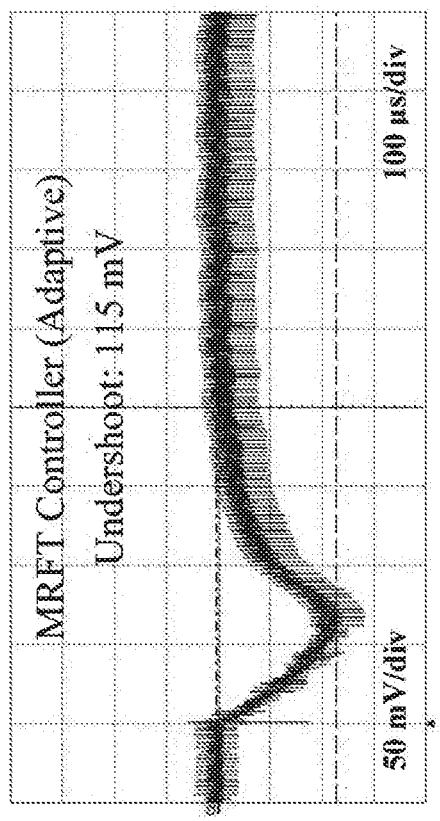
FIG. 12a shows the transient response of the output voltage of a DC-DC switching buck converter due to a step in the load current from 0.27 A to 1.27 A, where the converter has an inductance value of 4.8 µH and a capacitance value of 660 µF, and where the PID controller of the converter is tuned with the MRFT autotuning method, according to some embodiments.
Figure 13B:
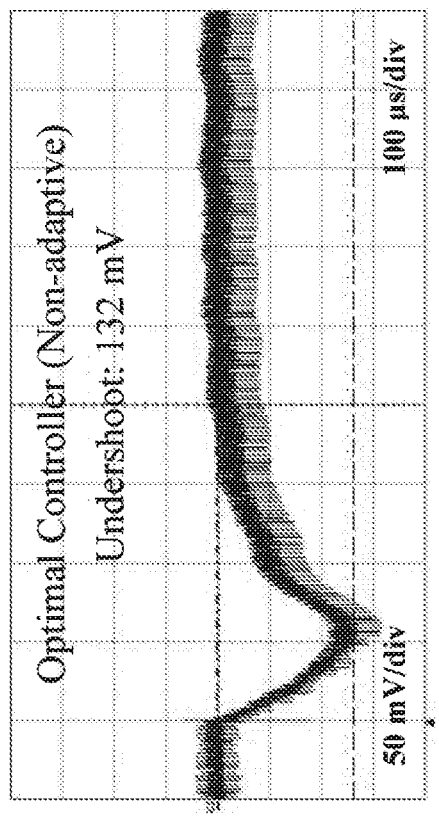
FIG. 13b shows a transient response of the output voltage of a DC-DC switching buck having the same inductance and capacitance values as in FIG. 13a and for the same step in load current like in FIG. 13a, but where the PID controller of the converter, unlike
Figure 13A:
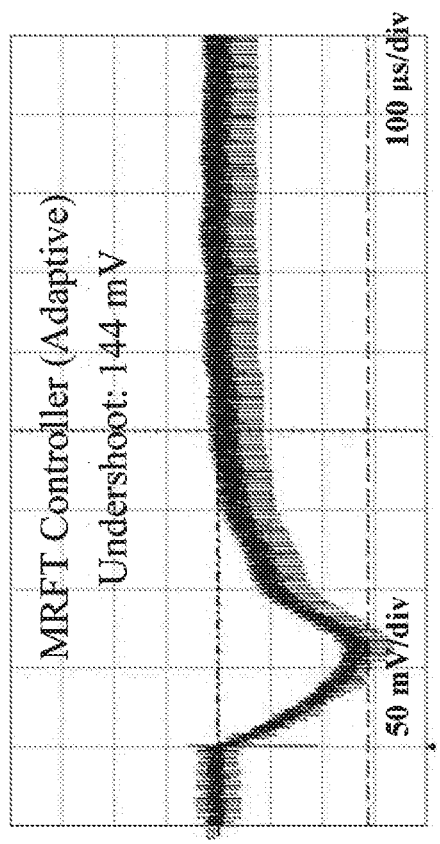
FIG. 13a shows the transient response of the output voltage of a DC-DC switching buck converter due to a step in the load current from 0.27 A to 1.27 A, where the converter has an inductance value of 4.8 µH and a capacitance value of 440 µF, and where the PID controller of the converter is tuned with the MRFT autotuning method, according to some embodiments.

Table 1 above lists the PID controller parameters for the MRFT blocks and the optimized controllers of each of the four tested designs. FIGS. 6a-9b show the experimental voltage output waveforms for the $V_{o\text{-}ref}$ step tests, while FIGS. 10a-13b show the experimental voltage output waveforms for a step change in the load. The overall performance of the MRFT block is quite close to that of the optimized controller. Furthermore, in many of the cases where the overshoot/undershoot of the optimized controller is (expectedly) less than that of the MRFT-autotuned controller, the settling time of the latter is the same or even better, as seen in FIG. 8. Finally, the cases of high overshoot/undershoot (such as FIGS. 8a, 9a, 12a, and 13a) are associated with low damping due to the choice of a smaller inductor L.

In the remainder of this section, the optimization framework used to arrive at the optimal set of ($\beta$, $c_1$, $c_2$, $c_3$) is described. The model below describes a general buck converter. The term $e^{-\tau s}$ represents the total delay due to sampling/control and the PWM operation, given by $\tau=1.5T_s$.

$$G_{buck}(s) = \frac{e^{-\tau s}}{LC_o s^2 + \frac{L}{R_o}s + 1}$$

Let $T_1 = \sqrt{LC_o}$ and $$T_2 = \frac{L}{R_o}.$$

$G_{buck}$ is said to have three following situational parameters, namely $T_1$, $T_2$, and $\tau$. The situational parameters may be reduced to two through use of the scaled Laplace variable $s'=T_1 s$, which results in the TF below having only $$\frac{\tau}{T_1} \text{ and } \frac{T_2}{T_1}$$

as situational parameters.

$$G_{buck}(s) = \frac{e^{\frac{\tau}{T_1}s'}}{s'^2 + \frac{T_2}{T_1}s' + 1}$$

In order to obtain a realistic range of TFs covering practical buck converter designs, basic component-sizing equations are utilized. The following equation may be used to determine the inductive value L in a DC-DC buck converter:

$$L = \frac{V_o(1-D)}{K_L I_o f_s}$$

where $V_o$ and $I_o$ are the nominal output voltage and nominal output current, respectively. $K_L$ is a coefficient related to the inductor current ripple and is typically set between 0.2 and 0.3 for a buck converter. $K_L=0.3$ is chosen to provide the minimum L, since L will be scaled up later. The nominal duty-cycle (D) is taken as 0.5. Noting that the ratio of $V_o$ to $I_o$ is equal to the load resistance ($R_o$), minimum inductance ($L_{min}$) is given by $$L_{min} = \frac{0.5 R_o}{0.3 f_s} = \frac{5}{3}\frac{R_o}{f_s}.$$

The design criteria for $C_o$, in the case of a low ESR, is given below where $K_c$ is the desired maximum percent ripple in the capacitor voltage.

$$C_o = \frac{1}{8 f_s}\frac{K_L I_o}{K_C V_o}$$

Choosing $K_C$ as 1%, the following expression is obtained for the minimum inductance, $C_{o\text{-}min}$:

$$C_{o\text{-}min} = \frac{1}{8 f_s}\frac{0.3 I_o}{0.01 V_o} = \frac{15}{4}\frac{1}{f_s R_o} = \frac{3.75}{f_s R_o}$$

Defining scaling factors $\alpha_L$ for L and $a_C$ for $C_o$, the situational parameters and thus the expression for $G_{buck}$ may be rewritten as follows:

$$T_1 = \sqrt{LC_o} = \sqrt{\alpha_L L_{min} \alpha_C C_{o\text{-}min}} = \frac{5}{2}\frac{\sqrt{\alpha_L \alpha_C}}{f_s}$$

$$T_2 = \frac{L}{R_o} = \frac{\alpha_L L_{min}}{R_o} = \frac{5}{3}\frac{\alpha_L}{f_s}$$

$$\rightarrow \frac{\tau}{T_1} = \frac{0.6}{\sqrt{\alpha_L \alpha_C}} \text{ and } \frac{T_2}{T_1} = \frac{2}{3}\sqrt{\frac{\alpha_L}{\alpha_C}}$$

$$G_{buck}(s) = \frac{e^{-\left(\frac{0.6}{\alpha_L \alpha_C}\right)s'}}{s'^2 + \left(\frac{2}{3}\sqrt{\frac{\alpha_L}{\alpha_C}}\right)s' + 1}$$

Comparing the characteristic polynomial in the denominator to the standard second order system format of $(s^2 + 2\zeta\omega_n + \omega_n^2)$, the damping factor $\zeta$ is found to be $$\frac{1}{3}\sqrt{\frac{\alpha_L}{\alpha_C}},$$

while the natural frequency $\omega_n$ is 1. By considering all combinations of $a_L$ and $a_C$ from 1 to 10, a whole range of converters are represented. An illustration of this in grid format is provided in Table 2.

TABLE 2

Grid of TFs representing the range of buck converter designs

| $\alpha_L$ | $\alpha_C$ | | | | | | | | | |
|---|---|---|---|---|---|---|---|---|---|---|
| | 1 | 2 | 3 | 4 | 5 | 6 | 7 | 8 | 9 | 10 |
| 1 | 1 | | | | | | | | | |
| 2 | 2 | 3 | | | | | | | | |
| 3 | 4 | 5 | 6 | | | | | | | |
| 4 | 7 | 8 | 9 | 10 | | | | | | |
| 5 | 11 | 12 | 13 | 14 | 15 | | | | | |
| 6 | 16 | 17 | 18 | 19 | 20 | 21 | | | | |
| 7 | 22 | 23 | 24 | 25 | 26 | 27 | 28 | | | |
| 8 | 29 | 30 | 31 | 32 | 33 | 34 | 35 | 36 | | |
| 9 | 37 | 38 | 39 | 40 | 41 | 42 | 43 | 44 | 45 | |
| 10 | 46 | 47 | 48 | 49 | 50 | 51 | 52 | 53 | 54 | 55 |

Finally, to justify the approximation of neglecting the zero that appears in the transfer function when the output capacitor has a non-negligible ESR, the ESR effect is represented to some extent by increasing the damping ($\zeta$). This is done by making sure $a_L \geq a_C$, which results in $\zeta$ being $\geq 1/3$. A total of 55 TFs (shown as shaded boxes in the figure below) are obtained after applying the criterion $\alpha_L \geq \alpha_C$. The TFs are numbered serially from 1 to 55, with the TF number appearing in the respective box in Table 2.

The optimization framework consists of two stages. In the first stage, the optimized value ($\beta$, $c_1$, $c_2$, $c_3$) for every TF of the grid in Table 2 is obtained through optimization of the transient response in simulation, using the derived model $G_{buck}$. The transient performance is evaluated using the "integral of time weighted absolute error" (ITAE), calculated using the following equation, where X is the vector [$\beta$, $c_1$, $c_2$, $c_3$]. $t_{init}$ is the time instant at which the transient occurs, and $t_s$ is the settling time.

$$ITAE(X) = \int_{t_{init}}^{t_s} (t - t_{init})|e(t - t_{init}, X)|dt$$

A combination of computer-based simulation programs, such as MATLAB® and SIMULINK®, also available from MathWorks, Inc., may be used for this purpose. A processes of finding a minimum of an unconstrained multivariable function using derivative-free method, e.g., the fminsearch function in MATLAB® which is based on the Nelder-Mead simplex direct search algorithm, is used for the optimization. Each iteration of the optimization consists of the following 3 steps.

1. The MRFT block described by the diagram of FIG. 1a, with the modified relay as described in Eq. (2) and with $W(s) = G_{buck}(s)$, is simulated by the computer-based simulation programs using the initial/current value of $\beta$. Measurements of $T_u$ and $a_0$ from the simulation are obtained.
2. PID controller coefficients are calculated from (4) using $T_u$ and $a_0$ from step 1 and the initial/current ($c_1$, $c_2$, $c_3$).
3. Using the PID controller coefficients from step 2 and the current $G_{buck}$, a closed-loop simulation of a step in $V_{o-ref}$ is performed and the ITAE is calculated.

After every iteration (of steps 1-3), the set ($\beta$, $c_1$, $c_2$, $c_3$) is updated by the fminsearch function to result in a lower ITAE—while still ensuring that the updated ($\beta$, $c_1$, $c_2$, $c_3$) still satisfy the constraints in Eq. (5). The iterations (of steps 1-3) are repeated until the improvement in ITAE is below the specified tolerance. Let the 55 TFs in the grid of FIG. 4 be referred to as $G_{buck-n}$ for n=1 to 55. The final output of the first stage of optimization is therefore a group of locally optimized sets ($\beta^n$, $c_1^n$, $c_2^n$, $c_3^n$) for n=1 to 55, where each ($\beta^n$, $c_1^n$, $c_2^n$, $c_3^n$) results in the lowest ITAE for the corresponding $G_{buck-n}$.

The second stage of the optimization applies the principle of "least performance degradation" to obtain a globally optimized set of ($\beta$, $c_1$, $c_2$, $c_3$). This is done as follows:

1. Using $\beta^1$ (the optimized $\beta$ found for $G_{buck-1}$), MRFT is simulated for $G_{buck-1}$ to $G_{buck-55}$. Respective MRFT measurements, $T_{u1}^n$ and $a_{01}^n$ (for n=1 to 55), are recorded.
2. Now using $c_1^1$, $c_2^1$, and $c_3^1$ (which are locally optimized for $G_{buck-1}$), along with $T_{u1}^n$ and $a_{01}^n$ (for n=1 to 55) from the previous step, a PID controller $C_1^n(s)$ is designed for each of $G_{buck-1}$ to $G_{buck-55}$ using (10). Thus, $C_1^n(s)$ is based on $G_{buck-n}$ and the set ($\beta^1$, $c_1^1$, $c_2^1$, $c_3^1$) that is locally optimized to $G_{buck-1}$.
3. Next, each $G_{buck-n}$ is simulated in closed-loop using its corresponding PID controller from the previous step, $C_1^n(s)$. For example: $G_{buck-1}$ with $C_1^1(s)$, $G_{buck-2}$ with $C_1^2(s)$, and so on. Each time the corresponding ITAE, denoted $ITAE_1^n$ (for n=1 to 55) is recorded. The single maximum (worst-case) ITAE $$\max_{n=1,2,\ldots 55} ITAE_1^n,$$

is then found.

4. Steps 1, 2, and 3 are repeated using ($\beta^2$, $c_1^2$, $c_2^2$, $c_3^2$) to obtain $ITAE_2^n$ for n=1 to 55, and $$\max_{n=1,2,\ldots 55} ITAE_2^n$$

is recorded. This is repeated until all worst-case ITAEs, $$\max_{n=1,2,\ldots 55} ITAE_k^n \text{ (for } k = 1 \text{ to } 55\text{)},$$

are recorded.

The globally optimized set, $(\beta^*, c_1^*, c_2^*, c_3^*)$, is the set with the lowest $$\max_{n=1,2,\ldots 55} ITAE_k^n \text{ for } k = 1 \text{ to } 55.$$

In other words, it is the set that results in the least performance degradation when applied to all converters in the considered range. This completes the second stage of the optimization. Constraints used in the optimization process include restricting $\phi_m$ in Eq. (5) to $[20°, 60°]$, $c_2$ to $[0.1, 100]$ to limit the integral action, and restricting $c_1$ and $c_3$ to being positive. A final constraint was to set the minimum $\beta$ to $-0.2$, since large negative values of $\beta$ may be difficult to apply in practice due to the oscillations associated with having a smaller amplitude thus making their accurate measurement a challenging task. Performing the optimization process above for the system represented by $G_{buck}$ and for the range of parameters defined by the grid of Table 2, the globally optimized set was found to be $(\beta^3, c_1^3, c_2^3, c_3^3)$, which resulted in $\phi_m=35°$. The numerical values of the parameters in this set were:

$$\beta^*=-0.2, c_1^*=0.69, c_2^*=1.14, c_3^*=0.19$$

In other words, using $(\beta^*, c_1^*, c_2^*, c_3^*)=(\beta^3, c_1^3, c_2^3, c_3^3)$ to tune a controller for every other $G_{buck-n}$ model in the considered range resulted in the least performance degradation from the locally optimized performance, $ITAE_3^3$. This worst-case degradation, $$\max_{n=1,2,\ldots 55} ITAE_3^n,$$

only 13% more than the locally optimized case $ITAE_3^3$. It is noted that the $(\beta^*, c_1^*, c_2^*, c_3^*)$ provided earlier in the manuscript included a ±5% tolerance for each parameter in the set. This is because as long as the four parameters satisfy the constraints in Eq. (5), the specified phase margin is guaranteed, and further if they are in the vicinity of the original values of $(\beta^3, c_1^3, c_2^3, c_3^3)$, then very similar dynamic performance is obtained.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

The invention claimed is:

1. A method of automatically tuning a proportional-integral-derivative (PID) controller controlling a DC-DC buck switching power converter, comprising:
   a) substituting the PID controller with a modified relay feedback test (MRFT) block having an MRFT magnitude (h) and a threshold parameter ($\beta$);
   b) determining a current error signal (e[k]) by measuring an output voltage ($V_o[k]$) of the DC-DC buck switching power converter and comparing the output voltage ($v_o$) to a desired reference output voltage ($V_{o-ref}$);
   c) inputting the error signal (e[k]) to the MRFT block;
   d) producing a MRFT block output signal u[k] in accordance with MRFT block equations, which can only be D+h or D−h, where D is a nominal duty-cycle, and updating the nominal duty cycle (D) to the value given by the controller output signal u[k];
   e) operating the DC-DC buck switching power converter using the updated nominal duty cycle (D);
   f) repeating steps from b) through e), which results in generation of self-excited oscillations due to the switching of the MRFT block output between the values D+h and D−h, until a predefined number of cycles ($N_{cycles}$) is observed;
   g) measuring a frequency ($\Omega_0$) and amplitude ($a_0$) of oscillations of the output voltage ($V_o[k]$) of the DC-DC buck switching power converter;
   h) updating PID controller parameters based on the frequency ($\Omega_0$) and amplitude ($a_0$) of the oscillations of the voltage output ($V_o[k]$) of the DC-DC buck switching power converter; and
   i) substituting the MRFT block with the PID controller.

2. The method according to claim 1, further comprising:
   j) comparing the error signal (e[k]) against previous maximum and minimum values of the error signal ($e_{max}$, $e_{min}$);
   k) determining a new maximum value ($e_{max}$) if the current error signal value (e[k]) is greater than the previous maximum value;
   l) determining a new minimum value ($e_{min}$) if the current error signal value (e[k]) is less than the previous minimum value; and
   m) determining the current value of the MRFT block output signal (u[k]) based on the new maximum or minimum value ($e_{max}$, $e_{min}$), the previous value of the MRFT block output signal (u[k−1]), the current error signal value (e[k]), and the MRFT block threshold parameter ($\beta$) and magnitude (h) in such a way that the current value of the MRFT block output signal (u[k]) is set to be D+h if (e[k]≥−$\beta$×$e_{min}$ and u[k−1]=D−h) or if (e[k]≥−$\beta$×$e_{max}$ and u[k−1]=D+h); and the current value of the MRFT block output signal (u[k]) is set to be D−h if (e[k]≤−$\beta$×$e_{max}$ and u[k−1]=D+h) or if (e[k]≤−$\beta$×$e_{min}$ and u[k−1]=D−h).

3. The method according to claim 2, wherein an initial number of cycles ($N_{discard}$) are disregarded when measuring the frequency ($\Omega_0$) and amplitude ($a_0$) of the oscillations of the output voltage ($V_o[k]$) of the DC-DC buck switching power converter (step g).

4. The method according to claim 3, wherein the PID controller parameters are updated based on a number of recorded cycles ($N_{MRFT}$) which equals a total number of cycles ($N_{cycles}$) minus the initial number of cycles ($N_{discard}$), an elapsed time period ($T_{MRFT}$) of the number of recorded cycles ($N_{MRFT}$), and the frequency ($\Omega_0$), where $$\Omega_0 = \frac{2\pi}{\frac{T_{MRFT}}{N_{MRFT}}}.$$

5. The method according to claim 4, wherein the PID controller parameters are updated based on the amplitude ($a_0$) where $$a_0 = \frac{\sum N_{MRFT} e_{max} + \sum N_{MRFT} |e_{min}|}{2 N_{MRFT}}.$$

6. The method according to claim 5, further comprising the step of:

n) calculating a proportional gain ($K_c$), an integral time ($T_i$), and a derivative time ($T_d$) for the PID controller, where:

$$K_c = c_1 \frac{4h}{\pi a_0}, T_i = c_2 \frac{2\pi}{\Omega_0}, T_d = c_3 \frac{2\pi}{\Omega_0}.$$

7. The method according to claim 6, where $c_1=0.69\pm5\%$, $c_2=1.14\pm5\%$, and $c_3=0.19\pm5\%$.

8. The method according to claim 6, in which the coefficients $c_1$, $c_2$, and $c_3$ are selected to satisfy the equations: $c_1\sqrt{1+\xi^2}=1$ and $\beta=\sin(\phi_m-\tan^{-1}\xi)$, where $$\xi = 2\pi c_3 - \frac{1}{2\pi c_2}$$

and ($\phi_m$) is a desired phase margin.

9. The method according to claim 1, where a threshold parameter $\beta=-0.2\pm5\%$.

10. A non-transitory computer readable storage medium having data stored therein representing software executable by a computer, the software including instructions to:

switch a controller circuit of a DC-DC buck switching power converter from a proportional-integral-derivative (PID) controller enforcing a nominal duty cycle (D) of the converter to a modified relay feedback test (MRFT) block having an MRFT magnitude (h) and a threshold parameter ($\beta$);

determine a current error signal (e[k]) by measuring an output voltage ($V_o[k]$) of the DC-DC buck switching power converter and comparing the output voltage ($V_o[k]$) to a desired reference output voltage ($V_{o\text{-}ref}$);

input the error signal (e[k]) to the MRFT block;

determine a controller output signal (u[k]) of the MRFT block;

update the nominal duty cycle (D) to the value given by the controller output signal (u[k]);

operate the DC-DC buck switching power converter using the updated nominal duty cycle (D);

observe appearance of self-excited oscillations and repeat the preceding instructions for a predetermined number of cycles ($N_{cycles}$) of these oscillations;

measure a frequency ($\Omega_0$) and amplitude ($a_0$) of oscillations of the output voltage ($V_o[k]$) of the DC-DC buck switching power converter;

update PID controller parameters based on the frequency ($\Omega_0$) and amplitude ($a_o$) of the oscillations of the voltage output ($V_o[k]$) of the DC-DC buck switching power converter; and switch the controller circuit of the DC-DC buck switching power converter from a MRFT block to the PID controller.

11. The non-transitory computer readable storage medium according to claim 10, wherein the software further includes instructions to:

compare the error signal (e[k]) against previous maximum and minimum values of the error signal ($e_{max}$, $e_{min}$);

store a new maximum value ($e_{max}$) in transitory memory if the current error signal value (e[k]) is greater than the previous maximum value;

store a new minimum value ($e_{min}$) in transitory memory if the current error signal value (e[k]) is less than the previous minimum value; and calculate current value of the MRFT block output signal (u[k]) based on the new maximum or minimum value ($e_{max}$, $e_{min}$), the previous value of the MRFT block output signal (u[k−1]), the current error signal value (e[k]), and the MRFT block threshold parameter ($\beta$) and magnitude (h) in such a way that the current value of the MRFT block output signal (u[k]) is set to be D+h if (e[k]≥−$\beta \times e_{min}$ and u[k≤−1]=D−h) or if (e[k]≥−$\beta \times e_{max}$u[k−1]=D+h); and the current value of the MRFT block output signal (u[k]) is set to be D−h if (e[k]≤−$\beta \times e_{max}$ and u[k−1]=D+h) or if (e[k]≤−$\beta \times e_{min}$ and u[k−1]=D−h), and store it in transitory memory.

12. The non-transitory computer readable storage medium according to claim 10, wherein the software further includes instructions to discard the frequency ($\Omega_0$) and amplitude ($a_0$) of the oscillations of the output voltage ($V_o[k]$) of the DC-DC buck switching power converter data collected during an initial number of cycles ($N_{discard}$).

13. The non-transitory computer readable storage medium according to claim 12, wherein the software further includes instructions to update the PID controller parameters based on a number of recorded cycles ($N_{MRFT}$) which equals a total number of cycles ($N_{cycles}$) minus the initial number of cycles ($N_{discard}$), an elapsed time period ($T_{MRFT}$) of the number of recorded cycles ($N_{MRFT}$), and the frequency ($\Omega_0$), where $$\Omega_0 = \frac{2\pi}{\frac{T_{MRFT}}{N_{MRFT}}}.$$

14. The non-transitory computer readable storage medium according to claim 13, wherein the software further includes instructions to update the PID controller parameters based on the amplitude ($a_0$) where $$a_0 = \frac{\sum N_{MRFT} e_{max} + \sum N_{MRFT} |e_{min}|}{2 N_{MRFT}}.$$

15. The non-transitory computer readable storage medium according to claim 14, wherein the software further includes instructions to calculate a proportional gain ($K_c$), $T_i$ an integral time ($T_i$), and a derivative time ($T_d$) for the PID controller, where:

$$K_c = c_1 \frac{4h}{\pi a_0}, T_i = c_2 \frac{2\pi}{\Omega_0}, T_d = c_3 \frac{2\pi}{\Omega_0}.$$

16. The non-transitory computer readable storage medium according to claim 15 having data stored therein representing a value of $c_1$ as 0.69±5%, a value of $c_2$ as 1.14±5%, and a value of $c_3$ is 0.19±5%.

17. The non-transitory computer readable storage medium according to claim 15, wherein the software further includes instructions to calculate the coefficients $c_1$, $c_2$, and $c_3$, which are selected to satisfy the equations: $c_1\sqrt{1+\xi^2}=1$ and $\beta=\sin(\phi_m-\tan^{-1}\xi)$, where $$\xi = 2\pi c_3 - \frac{1}{2\pi c_2},$$

and ($\phi_m$) is a desired phase margin.

18. The non-transitory computer readable storage medium according to claim 11 having data stored therein representing a value of threshold parameter $\beta$ as $-0.2\pm5\%$.

* * * * *